United States Patent [19]

Morgott et al.

[11] Patent Number: 4,829,417

[45] Date of Patent: May 9, 1989

[54] HIGH-POWER TRANSFORMER

[75] Inventors: Horst Morgott, Diedorf; Edmund Poetsch, Koenigsbrunn; Erich Schmidtner, Munich; Hans-Hasso Goercke, Augsburg, all of Fed. Rep. of Germany

[73] Assignee: Siemens Aktiengesellschaft, Berlin and Munich, Fed. Rep. of Germany

[21] Appl. No.: 71,411

[22] Filed: Jul. 9, 1987

[30] Foreign Application Priority Data

Jul. 10, 1986 [DE] Fed. Rep. of Germany ....... 3623290

[51] Int. Cl.4 ........................ H02M 7/06; H01E 27/28

[52] U.S. Cl. ................................ 363/126; 174/114 R; 174/129 R; 336/186

[58] Field of Search ............. 363/20, 126; 174/114 R, 174/117 P, 114 S, 129 R, 129 S; 336/186, 187

[56] References Cited

U.S. PATENT DOCUMENTS

| | | | |
|---|---|---|---|
| 587,764 | 8/1897 | Short | 174/129 R |
| 851,467 | 4/1907 | Wood | 336/186 |
| 1,213,689 | 1/1917 | Price | 336/186 X |
| 2,187,213 | 1/1940 | Milliken | 174/114 S |
| 2,978,530 | 4/1961 | Braeckman | 174/129 R X |
| 3,256,417 | 6/1966 | Merrett | 336/187 X |
| 3,747,205 | 7/1973 | Moore | 336/187 X |
| 4,431,860 | 2/1984 | Perco et al. | 336/187 X |
| 4,538,024 | 8/1985 | Wise et al. | 174/117 F |

FOREIGN PATENT DOCUMENTS

| | | | |
|---|---|---|---|
| 133220 | 7/1984 | European Pat. Off. | 174/114 R |
| 3205650 | 8/1983 | Fed. Rep. of Germany | 363/126 |
| 1198126 | 12/1959 | France | 336/186 |
| 1156133 | 6/1969 | United Kingdom | 174/129 R |

*Primary Examiner*—Thomas J. Kozma

*Attorney, Agent, or Firm*—Hill, Van Santen, Steadman & Simpson

[57] ABSTRACT

The secondary winding of a high power transformer for clocked power supplies is composed of a plurality of skeins extending parallel to one another which are, in turn, constructed of a plurality of stranded conductors extending parallel to one another, whereby the stranded conductors are composed of wire-shaped individual conductors respectively provided with an insulating surface and twisted or woven with one another. All stranded conductors are electrically and mechanically connected to one another at both ends of their respective skeins and all skeins are connected to one another at one end of the secondary winding and connected to one another across respective rectifiers at the other end thereof.

5 Claims, 2 Drawing Sheets

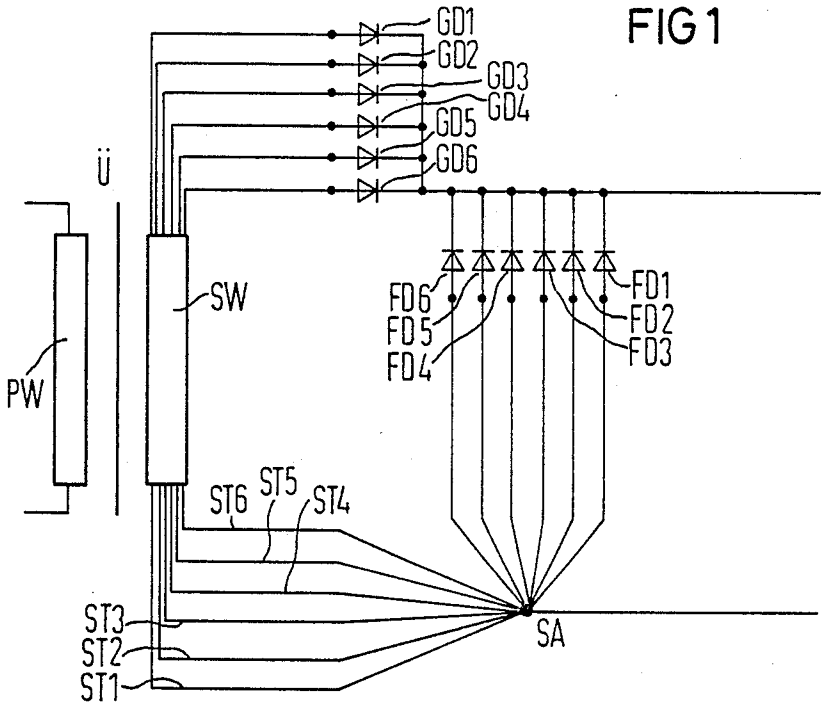
FIG 1
FIG 2
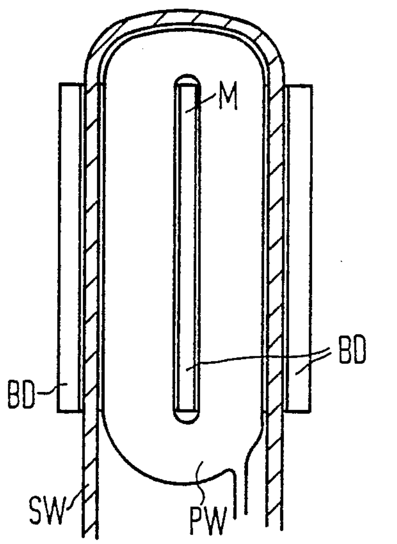

HIGH-POWER TRANSFORMER

BACKGROUND OF THE INVENTION

1. Field of the Invention

The present invention is directed to a high-power transformer for clocked power supplies comprising at least one primary winding and at least one secondary winding whose respective turns are fashioned as a stranded conductor which, in turn, composed of wire-shaped individual conductors which are provided with an electrically-insulating surface and which are twisted or woven with one another.

2. Description of the Prior Art

Winding conductors for such transformers are known from the European patent application EP-A No. 0133220 and from the French Pat. No. 1198126, both of which are incorporated herein by this reference.

Designs and constructions of standard transformers do not present a person skilled in the art with any difficulties either in theory or in practice. In some applications, however, such as utilization in clocked power supplies having a high output power and high clock frequency, a number of extreme requirements are made of a transformer, this making the realization thereof significantly more difficult.

The requirement for high output current is initially countered with a secondary winding of thick copper bands. In addition to the difficulties in manufacture, however, these transformers were too large and too heavy. When the frequency was then increased in order to save iron in the transformer core, then the skin effect appeared, this causing the charge carriers to be displaced into the edge zone of a conductor. Despite solid copper bands, an increase in the internal resistance of the windings and, therefore, an increased transmission loss then had to be accepted. In order to overcome this disadvantage, the German Pat. No. 32 05 650, fully incorporated herein by this reference, discloses that the thick and solid copper band of a secondary winding be replaced by a plurality of thinner bands insulated from one another and connected to diodes which have their outputs connected together whereby the current is distributed to the diodes.

The efficiency of a transformer constructed in accordance with the above principal decreases with increasing current strength and frequency.

SUMMARY OF THE INVENTION

It is therefore an object of the present invention to improve the efficiency in a high power transformer with respect to frequency and current behavior.

The above object is achieved, according to the present invention, in a high power transformer for clocked power supplies which comprises at least one primary winding and at least one secondary winding in which the representative turns are constructed with a stranded conductor which is, in turn, composed of wire-shaped individual conductors which are provided with an electrical insulating surface and which are twisted or woven with one another and at both ends electrically connected to one another, and which is particularly characterized in that the secondary winding, is composed of a plurality of skeins which lie parallel to one another and which are, in turn, constructed of a plurality of stranded conductors lying parallel to one another, and electrically and mechanically connected to one another at both ends of their respective skeins, in that the skeins having first ends electrically and mechanically connected to one another at one end of the secondary winding, and in that the skeins having second ends electrically connected to one another across rectifiers, wherein the second ends one each connected to a different rectifier.

In such a high power transformer, an increase in resistance due to the skin effect is avoided in that the cross section of the individual conductors is only of such size that, at a given frequency, optimally no space free of charge carriers arises within each of the wire-shaped individual conductors.

In such an embodiment, it must be taken into consideration for the relevant frequencies that a high-power transformer, for example a transformer in clocked power supplies, is usually driven with square wave primary signals, and harmonic currents up to at least a factor of 10 above the clock frequency are also required for an approximately correct transmission of the square wave signal.

The eddy current losses in the transformer are also reduced to a minimum by this measure since the differences of the current densities of the individual conductors are increased toward the axis of the winding in comparison to one another and are compensated by twisting or weaving the individual conductors in the stranded conductor. In accordance with the principle of a Roebel bar, every individual conductor assumes every position in the overall cross section of the stranded conductor just as frequently and over the same length as each other individual conductor.

The skeins, guided in parallel in the secondary winding, enable an accurate current symmetry that is a prerequisite for a distribution of the current onto, for example, a plurality of diodes connected in parallel.

According to a particular feature of the invention, the transformer is characterized in that the stranded conductors and the skeins each comprise a rectangular cross section and that the secondary winding is constructed as a U shaped band comprising skeins lying one upon another in planes parallel to one another.

According to another feature of the invention, the transformer is particularly characterized in that the turns of the primary winding and of the secondary winding are composed of stranded conductors, preferably having the identical dimensions.

According to another feature of the invention, the transformer is characterized in that, given different lengths of the skeins, the stranded conductors contain different numbers of individual conductors for the compensation of the differences and resistance which thereby arise.

According to another feature of the invention, the transformer is particularly characterized in that at least one individual conductor of the stranded conductors serving as a primary winding is provided with a surface color that differs from that of the other individual conductors.

According to another feature of the invention, the stranded conductor is constructed as a copper weave.

A high filling factor in the secondary winding and the primary winding and, therefore, an optimum space utilization is achieved with such embodiments of the stranded conductors and of the skeins.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit diagram for the secondary circuit of a high power transformer, constructed in accordance with the present invention, and comprising parallel rectifier diodes and free-wheeling diodes;

FIG. 2 is a sectional view taken through a high power transformer which comprises a primary winding and a secondary winding composed of a single turn.

DESCRIPTION OF THE PREFERRED EMBODIMENTS

FIG. 1 schematically illustrates a high power transformer U whose secondary winding SW is composed of one turn comprising six skeins ST1–ST6 connected in parallel. All skeins ST1–ST6 are connected to a collecting point SA at one end of the secondary winding SW. At the other end of the secondary winding SW each skein is connected to a respective rectifier diode GD1–GD6. Six free-wheeling diodes are provided at FD1–FD6 and are connected in parallel with one another between the collecting point SA and the outputs of the rectifier diodes GD1–GD6.

Not only are mechanical problems of the geometry of the terminals resolved with the illustrated type of current division onto the rectifier diodes GD1–GD6, but an accurate current symmetry and far-reaching thermal and electrical independence of the rectifier diodes GD1–GD6 relative to one another is also achieved. The electrical and thermal conditions are the same in every skein ST1–ST6.

Due to the construction of the secondary winding SW, according to the present invention, the high frequency currents in the secondary circuit between the free-wheeling diodes FD1–FD6 and the rectifier diodes GD1–GD6 cause only slight losses that also produce a low temperature (for example below 80° C.) of the high power transformer U and a high efficiency (for example, above 96% at 600 amperes).

The structure of an exemplary high power transformer may be seen in FIG. 2. The primary winding PW and the secondary winding SW composed of a single turn lie between the floor and cover portions BD of ferrite material and respectively comprising E-shaped profiles. The inwardly located primary winding PW is composed of a plurality of turns with the stranded conductor of the present invention wound about the central web M of the E-shaped floor and cover portions BD. The single turn of the secondary winding SW conforms to the U-shaped structure against the structure of the primary winding PW. An optimally good coupling is thereby established even given an extremely high transformer ratio.

Figure 3:
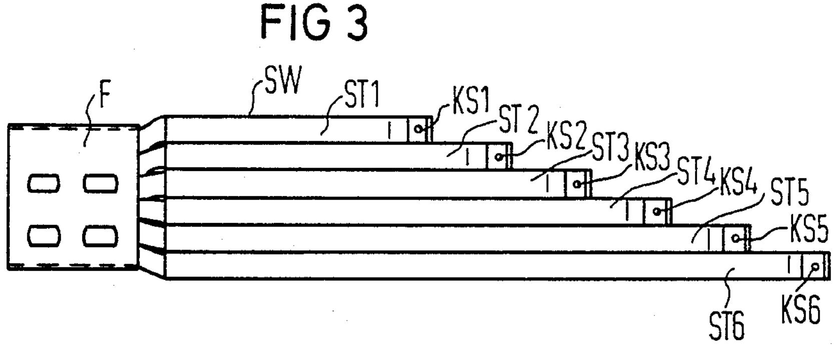
FIGS. 3, 3a and 3b illustrate a feature of the secondary winding of FIG. 2.
Figure 3A:
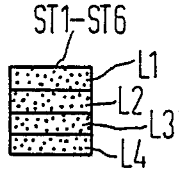
Figure 3B:
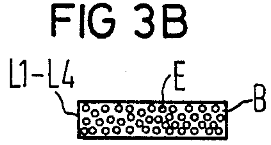

The structure of a secondary winding SW of the present invention is illustrated in FIGS. 3, 3a, 3b. The secondary winding SW is composed of six parallel skeins ST1–ST6 lying side-by-side in a single plane which are, in turn, each formed of four stranded conductors L1–L4 lying parallel to one another. The stranded conductors L1–L4 are, in turn, constructed as a woven copper band B having a rectangular cross section and containing a high number of individual conductors E electrically insulated from one another that are twisted or woven with one another. The cross section of the individual skeins ST1–ST6 is therefore likewise rectangular so that a band-shaped secondary winding SW derives as a result thereof.

At one end of the secondary winding SW, the six skeins ST1–ST6 are arranged step-shaped with increasing length in order to keep the connecting lines to the rectifier diodes D1–D6 lying in a row as short as possible. For the other end of the secondary winding, the flange F is provided for connection to the collecting point SA, the flange F electrically and mechanically connecting the six skeins ST1–ST6 and, therefore, all individual conductors E of all stranded conductors L to one another.

For connection to the rectifier diodes GD1–GD6, the individual conductors E of the respective skeins ST1–ST6 are electrically and mechanically connected to one another with the assistance of a cable shoe KS1–KS6. Shrink tubes (not shown) that are respectively drawn over a skein serve for bundling the stranded conductors L1–L4 of a skein ST.

For a cost-effective fabrication of the high power transformer U, it is recommended to employ a stranded conductor L having the same dimensions for the primary winding PW and for the secondary winding SW, even though it can be necessary that a difference in resistance which thereby arises due to the different lengths of the skeins ST1–ST6 must be compensated. Stranded conductors L having a different number of individual conductors E are then to be used for this purpose.

The formation of the primary winding as a stranded conductor comprising individual conductors E insulated from one another makes it possible to use an individual conductor of the stranded conductor as a demagnetization winding of the high power transformer. This has the advantage of good coupling and of circuit-related simplifications. However, it is thereby advisable to provide an individual conductor of the stranded conductor with a surface color that makes it possible to be distinguished from the other individual conductors.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a high power transformer for clocked power supplies of the type which comprises at least one primary winding and at least one secondary winding the respective turns of which are constructed as a stranded conductor which includes wire-shaped individual conductors which are provided with an electrical insulating surface and which are twisted or woven with one another and at both ends electrically connected to one another, the improvement comprising:

said secondary winding including a plurality of skeins extending parallel to one another, each of said skeins comprising a plurality of said stranded conductors extending parallel to one another;

said stranded conductors being electrically and mechanically connected to one another at both ends of their respective skeins;

said skeins having first ends electrically and mechanically connected to one another at one end of said secondary winding;

a plurality of rectifiers;

said skeins having second ends electrically connected to one another across said rectifiers;

said stranded conductors and said skeins each comprise a rectangular cross-section; and said secondary winding comprises a U-shaped band including a plurality of said skeins lying one upon another in planes parallel to one another;

wherein said second ends of said skeins are each connected to a different one of said rectifiers.

2. The improved high power transformer of claim 1, wherein:

the turns of said primary winding and the turns of said secondary winding comprise stranded conductors having identical dimensions.

3. The improved high power transformer of claim 1, wherein:

each of said skeins has a respective length and the stranded conductors each contain different numbers of individual conductors for the compensation of the differences in resistance.

4. The improved high power transformer of claim 1, wherein:

at least one individual conductor of a stranded conductor serving as a primary winding is provided with a surface color that differs from that of the other individual conductors.

5. The improved high power transformer of claim 1, wherein:

the strand conductors are constructed as a copper weave.

* * * * *